United States Patent
Xie et al.

(10) Patent No.: US 8,849,130 B2
(45) Date of Patent: Sep. 30, 2014

(54) COHERENT OPTICAL RECEIVERS FOR COLORLESS RECEPTION

(75) Inventors: Chongjin Xie, Morganville, NJ (US); Peter J. Winzer, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 278 days.

(21) Appl. No.: 13/537,467

(22) Filed: Jun. 29, 2012

(65) Prior Publication Data

US 2013/0071124 A1 Mar. 21, 2013

Related U.S. Application Data

(60) Provisional application No. 61/537,056, filed on Sep. 20, 2011, provisional application No. 61/537,576, filed on Sep. 21, 2011.

(51) Int. Cl.
*H04B 10/00* (2013.01)
*H04B 10/61* (2013.01)

(52) U.S. Cl.
CPC .................. *H04B 10/611* (2013.01); *H04B 10/616* (2013.01)
USPC .............................. 398/204; 398/203; 398/202

(58) Field of Classification Search
CPC ........................ H04B 10/61–10/6151
USPC ................................. 398/202–214
See application file for complete search history.

(56) References Cited

U.S. PATENT DOCUMENTS

| | | | | |
|---|---|---|---|---|
| 4,732,447 A * | 3/1988 | Wright et al. | ................ | 385/46 |
| 4,829,598 A * | 5/1989 | Auracher et al. | ............ | 398/204 |
| 4,868,896 A * | 9/1989 | Pietzsch | ....................... | 398/204 |
| 5,355,243 A * | 10/1994 | King | ............................. | 398/203 |
| 5,491,763 A * | 2/1996 | van Deventer et al. | ......... | 385/24 |
| 7,085,501 B1 * | 8/2006 | Rickard et al. | ................ | 398/202 |
| 7,315,584 B1 * | 1/2008 | Epworth et al. | ................ | 375/316 |
| 7,522,842 B1 * | 4/2009 | McNicol et al. | ............... | 398/157 |
| 7,801,447 B1 * | 9/2010 | Williams | ....................... | 398/116 |
| 8,249,464 B2 * | 8/2012 | Oda et al. | ...................... | 398/162 |
| 8,630,551 B2 * | 1/2014 | Margraf et al. | ............... | 398/204 |
| 8,725,006 B2 * | 5/2014 | Huang et al. | .................. | 398/204 |
| 2005/0196176 A1 * | 9/2005 | Sun et al. | ...................... | 398/152 |
| 2005/0259907 A1 * | 11/2005 | Tan et al. | ........................ | 385/11 |
| 2009/0129788 A1 * | 5/2009 | Seimetz | ......................... | 398/208 |
| 2009/0274470 A1 * | 11/2009 | Yoshino et al. | ............... | 398/183 |
| 2010/0028024 A1 * | 2/2010 | Shpantzer et al. | ............ | 398/214 |
| 2010/0046961 A1 * | 2/2010 | Tanimura et al. | ............. | 398/159 |
| 2010/0254718 A1 * | 10/2010 | Oda et al. | ...................... | 398/202 |
| 2011/0026940 A1 * | 2/2011 | Komaki | ......................... | 398/202 |
| 2011/0064422 A1 * | 3/2011 | Kim et al. | ...................... | 398/214 |

(Continued)

*Primary Examiner* — Agustin Bello
(74) *Attorney, Agent, or Firm* — A Ralston

(57) ABSTRACT

One coherent optical receiver includes a 3×3 coupler for receiving a signal and a local oscillator into a first and a third input port respectively, and three detectors for detecting a respective output of the coupler to generate corresponding first, second and third detected signals. A detected signal is filtered by an Alternating Current (AC) coupler to generate a respective first, second or third filtered signal. An adder adds the first, the second and the third filtered signals to determine a directly detected signal term. A first subtractor subtracts the directly detected signal term from the first filtered signal to determine an in-phase signal. A second subtractor subtracts the directly detected signal term from the third filtered signal to determine a quadrature signal. A digital signal processor processes the in-phase signal and the quadrature signal to recover the optical signal.

25 Claims, 3 Drawing Sheets

(56) References Cited

U.S. PATENT DOCUMENTS

| | | | |
|---|---|---|---|
| 2012/0002979 A1* | 1/2012 | Xie | 398/208 |
| 2012/0087661 A1* | 4/2012 | Look | 398/65 |
| 2012/0251118 A1* | 10/2012 | McNicol | 398/82 |
| 2012/0308233 A1* | 12/2012 | Hironishi et al. | 398/65 |
| 2013/0071124 A1* | 3/2013 | Xie et al. | 398/82 |
| 2013/0148985 A1* | 6/2013 | Barton et al. | 398/212 |
| 2013/0216228 A1* | 8/2013 | Nazarathy et al. | 398/65 |
| 2013/0336665 A1* | 12/2013 | Suzuki | 398/208 |

* cited by examiner

COHERENT OPTICAL RECEIVERS FOR COLORLESS RECEPTION

RELATED APPLICATIONS

This application claims priority pursuant to 35 U.S.C. 119 to U.S. Provisional Application No. 61/537,056 filed Sep. 20, 2011, and U.S. Provisional Application No. 61/537,576 filed Sep. 21, 2011, both entitled "COHERENT OPTICAL RECEIVERS FOR COLORLESS RECEPTION," the subject matter thereof being fully incorporated herein by reference.

FIELD OF INVENTION

The invention(s) relate to optical communication equipment and, more specifically but not exclusively, to equipment for coherently receiving optical signals.

DESCRIPTION OF THE RELATED ART

This section introduces aspects that may help facilitate a better understanding of the invention(s). Accordingly, the statements of this section are to be read in this light and are not to be understood as admissions about what is in the prior art or what is not in the prior art.

In coherent receivers, a local oscillator (LO) and the received signal are mixed and beat in photo-detectors. The mixing of LO and the received signal in photo-detectors generates electrical currents with (1) a beat term, (2) a directly detected signal term, and (3) a directly detected LO term. The directly detected LO term can be eliminated by Alternating Current (AC) coupling, but the directly detected signal term still remains. The directly detected signal term will interfere with the desired beat term and degrades the performance of coherent optical receivers, especially in colorless operation where multiple Wavelength Division Multiplexed (WDM) channels are incident on the photo-detectors of the receiver, all of the WDM channels generating their own direct-detection terms. The problem is described, e.g., in L. E. Nelson et al., "Demultiplexing via a dual-polarization coherent receiver," Proc. IEEE Photonics Society Summer Topical Meetings, WA1.2 (2010). Therefore, techniques are needed to overcome the problem of interference from the many direct-detection WDM terms in a colorless coherent optical receiver.

SUMMARY

Problems in the prior art caused by interference from the many direct-detection WDM terms in a colorless coherent optical receiver are addressed by various embodiments of a coherent optical receiver provided herein.

There are various solutions for the interference problem described above. One solution uses an optical bandpass filter to eliminate those WDM channels whose direct-detection terms would induce severe crosstalk penalties. This solution, however, is not suitable for colorless receiver operation. Another solution increases the LO power in order to have a large LO to signal power ratio. Yet another solution uses balanced receivers, which inherently suppress the direct-detection terms according to their common-mode rejection ratio (CMRR). This second group of solutions are not good enough (sufficiently satisfactory) for colorless operation in a massive WDM environment. Even with a fifteen (15) dB LO to signal power ratio, the Optical Signal-to-Noise Ration (OSNR) penalty can reach three (3) dB with more than ten (10) incident channels. For a third solution, a high CMRR is needed, which places high requirements on the balance of the mixer and balanced detector pairs making up the coherent receiver front-end. Embodiments of the invention further address the problem of interference from the many direct-detection WDM terms in a colorless coherent optical receiver.

In one embodiment, an apparatus comprises an M×N coupler for receiving an optical signal into a first of M input ports of the M×N coupler and for receiving a local oscillator signal into a second of the M input ports, where M and N are integers larger than 2; N detectors, each detector for detecting a mixed signal from a respective output of the M×N coupler to generate one of N respective detected signals; N Alternating Current (AC) couplers, each AC coupler for filtering a respective one of the detected signals to correspondingly generate one of N filtered signals; an adder for adding the N filtered signals to determine a directly detected signal term; a first subtractor for subtracting the directly detected signal term from a first set of at least one of the N filtered signals to determine an in-phase signal; a second subtractor for subtracting the directly detected signal term from second set of at least one of the N filtered signals to determine a quadrature signal; and a digital signal processor for processing the in-phase signal and the quadrature signal in the digital domain to recover the optical signal.

In one embodiment, an apparatus comprises a 3×3 coupler for receiving an optical signal and a local oscillator signal into a first input port and a third input port respectively of the 3×3 coupler; three detectors, each detector for detecting a mixed signal from a respective output of the 3×3 coupler to generate one of a first detected signal, a second detected signal and a third detected signal; three AC couplers, each AC coupler for filtering a respective one of the first detected signal, the second detected signal and the third detected signal to correspondingly generate a first filtered signal, a second filtered signal or a third filtered signal; an adder for adding the first filtered signal, the second filtered signal and the third filtered signal to determine a directly detected signal term; a first subtractor for subtracting the directly detected signal term from the first filtered signal to determine an in-phase signal; a second subtractor for subtracting the directly detected signal term from the third filtered signal to determine a quadrature signal; and a digital signal processor for processing the in-phase signal and the quadrature signal in the digital domain to recover the optical signal.

In one embodiment, the apparatus further includes three analog-to-digital converters (ADCs), each ADC for digitizing one of the respective first, second or third filtered signals after the AC couplers. In one embodiment, the apparatus further includes three ADCs, a first ADC for digitizing the in-phase signal, a second ADC for digitizing the directly detected signal term, and a third ADC for digitizing the quadrature signal after the AC coupling.

In another embodiment, the digital signal processor compensates the in-phase signal and the quadrature signal utilizing the directly detected signal term. In yet another embodiment, the digital signal processor compensates the optical signal that is received based on the directly detected signal term.

In one embodiment, the 3×3 coupler has a 1:2:2 power split ratio. In another embodiment, the 3×3 coupler has a 1:1:1 power split ratio. Another embodiment may include one or more multipliers for scaling one or more of the first filter signal, second filter signal, and the third filter signal prior to at least one of the adder, the first subtractor and the second subtractor. The multipliers may be tuned based on feedback such as feedback based on the detected signal, feedback based on one or more of the in-phase signal, the quadrature signal, the recovered optical signal, feedback from the digital signal processor or feedback from the analog elements of the receiver.

In one embodiment, the multiplier is configured to apply scaling based on feedback from at least one of the digital signal processor, the 3×3 coupler, one or more of the detectors, one or more of the AC couplers, the adder, the first subtractor and the second subtractor.

In yet another embodiment, a method comprises receiving at a receiver an optical signal into a first input port of M input ports of a M×N coupler and local oscillator signal into a third input port of the M input ports of the M×N coupler and forming N output mixed signals, wherein M and N are integers larger than 2; detecting the N output mixed signals to generate a corresponding N detected signals; filtering the N detected signals to generate a corresponding N filtered signals; adding the N filtered signals to determine a directly detected signal term; subtracting from a first set of at least one of the N filtered signals the directly detected signal term to determine an in-phase signal; subtracting from a second set of at least one of the N filtered signals the directly detected signal term to determine a quadrature signal; and processing the in-phase signal and the quadrature signal in the digital domain to recover the optical signal.

In one embodiment, a method comprises receiving at a receiver an optical signal and local oscillator signal into a first input port and a third input port respectively of a 3×3 coupler to form output mixed signals; detecting the output mixed signals to correspondingly generate a first detected signal, a second detected signal and a third detected signal; filtering the first detected signal, the second detected signal and the third detected signal respectively to generate corresponding first filtered signal, second filtered signal and third filtered signal; adding the first filtered signal, the second filtered signal and the third filtered signal to determine a directly detected signal term; subtracting the directly detected signal term from the first filtered signal to determine an in-phase signal; subtracting the directly detected signal term from the third filtered signal to determine a quadrature signal; and processing the in-phase signal and the quadrature signal in the digital domain to recover the optical signal.

In one embodiment, the method includes converting the in-phase signal and the quadrature signal from the analog domain to the digital domain. In one embodiment, the method includes converting the first filtered signal, the second filtered signal and the third filtered signal from the analog domain to the digital domain. The adding and the subtracting may occur in the digital domain or the analog domain (e.g., the optical domain).

In embodiments, the 3×3 coupler may have a 1:2:2 power split ratio, a 1:1:1 power split ratio or another power split ratio. In one embodiment, the method includes multiplying the first filter signal, second filter signal, and the third filter signal by scaling factors prior to the adding, the subtracting to determine an in-phase signal and the subtracting to determine a quadrature signal.

In one embodiment, an apparatus comprises an M×N coupler for receiving an optical signal and a local oscillator signal into a first input port and a third input port respectively of the M×N coupler, wherein M and N are integers larger than 2; N detectors, each detector for detecting a mixed signal from a respective output of the N×N coupler to generate one of N detected signals; N Alternating Current (AC) couplers, each AC coupler for filtering a respective one of the N detected signals to correspondingly generate one of N filtered signals; a first combiner for combining a first set of scaled versions of the N filtered signals to determine an in-phase signal; a second combiner for combining a second set of scaled versions of the N filtered signals to determine a quadrature signal; and a digital signal processor for processing the in-phase signal and the quadrature signal in the digital domain to recover the optical signal.

In one embodiment, an apparatus includes a 3×3 coupler, three detectors, three Alternating Current (AC) couplers, a first combiner, a second combiner and a digital signal processor. The 3×3 coupler is configured to receive an optical signal and a local oscillator signal into a first input port and a third input port respectively of the 3×3 coupler. Each of the detectors is configured to detect a mixed signal from a respective output of the 3×3 coupler to generate one of a first detected signal, a second detected signal and a third detected signal. Each of the three AC couplers is configured to filter a respective one of the first detected signal, the second detected signal and the third detected signal to correspondingly generate a first filtered signal, a second filtered signal or a third filtered signal. The first combiner is configured to combine scaled versions of the first filtered signal, the second filtered signal and the third filtered signal to determine an in-phase signal. The second combiner is configured to combine scaled versions of the first signal term, the second filtered signal and the third filtered signal to determine a quadrature signal. The digital signal processor is configured to process the in-phase signal and the quadrature signal in the digital domain to recover the optical signal.

In one embodiment, the apparatus further includes three analog-to-digital converters (ADCs), each ADC for converting one of the first filtered signal, the second filtered signal and the third filtered signal into digital form. In one embodiment, the apparatus further includes a first ADC for converting the in-phase signal into digital form and a second ADC for converting the quadrature signal into digital form.

In another embodiment, the apparatus further includes an adder for adding the first filtered signal, the second filtered signal and the third filtered signal to determine a directly detected signal term, the directly detected signal term for delivery to the digital signal processor for compensation of the optical signal. In one embodiment, the 3×3 coupler has a 1:2:2 power split ratio. In one embodiment, the 3×3 coupler has a 1:1:1 power split ratio. Other power split ratios for the coupler are possible, with the scaling necessary to determine the in-phase signal and quadrature signal modified appropriately. Further, the scaled versions of the first filtered signal, the second filtered signal and the third filtered signal (i.e., the scaling of the filtered signals) may be tuned by a multipliers based on feedback such as one or more of the first detected signal, the second detected signal, the third detected signal, the in-phase signal, the quadrature signal, the recovered optical signal. Scaling may also be tuned from time to time based on feedback from the digital signal processor or feedback from the analog elements of the receiver.

One method embodiment comprises receiving at a receiver an optical signal and local oscillator signal into a first input port and a third input port respectively of a 3×3 coupler for forming output mixed signals; detecting the output mixed signals to correspondingly generate a first detected signal, a second detected signal and a third detected signal; filtering the first detected signal, the second detected signal and the third detected signals respectively to generate a first filtered signal, a second filtered signal and a third filtered signal; combining a first set of scaled versions of the first filtered signal, the second filtered signal and the third filtered signal to determine an in-phase signal; combining a second set of scaled versions of the first signal term, the second filtered signal and the third filtered signal to determine a quadrature signal; and processing the in-phase signal and the quadrature signal in the digital domain to recover the optical signal.

In one embodiment, an apparatus comprises a 90-degree hybrid for receiving an optical signal and a local oscillator signal into a first input port and a second input port respectively of the 90-degree hybrid; three detectors, a first detector for detecting the optical signal to generate a first detected signal, a second detector and third detector for detecting a mixed signal from a respective output of the 90-degree hybrid to correspondingly generate a second detected signal and a third detected signal; three Alternating Current (AC) couplers, each AC coupler for filtering a respective one of the first detected signal, the second detected signal and the third detected signal to correspondingly generate a first filtered signal, a second filtered signal or a third filtered signal; a first subtractor for subtracting the first filtered signal from the third filtered signal to determine a quadrature signal; a second subtractor for subtracting the first filtered signal from the second filtered signal to determine an in-phase signal; and a digital signal processor for processing the in-phase signal and the quadrature signal in the digital domain to recover the optical signal. The digital signal processor may be configured to compensate the optical signal based on the directly detected signal term.

BRIEF DESCRIPTION OF THE DRAWINGS

Other aspects, features, and benefits of various embodiments of the invention will become more fully apparent, by way of example, from the following detailed description and the accompanying drawings, in which.

To facilitate understanding, identical reference numbers have been utilized, where possible, to designate identical elements that are common to the figures.

DETAILED DESCRIPTION

Figure 1:
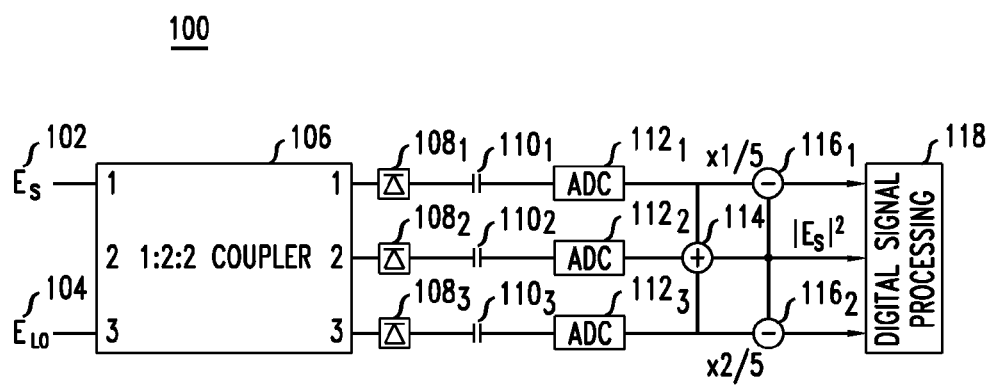
FIG. 1 depicts a high-level block diagram of one embodiment of a coherent optical receiver according to the principles of the invention.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used herein, the term "and" is used in both the conjunctive and disjunctive sense and includes any and all combinations of one or more of the associated listed items. The singular forms "a", "an" and "the" are intended to include the plural forms as well, unless the context clearly indicates otherwise. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

FIG. 1 depicts a high-level block diagram of one embodiment of a coherent optical receiver according to the principles of the invention. In the coherent optical receiver 100 of FIG. 1, a 3×3 coupler 106 with 1:2:2 power split ratio is used as an optical hybrid. A received signal $E_s$ 102 and local oscillator (LO) signal 104 enter into a first port (e.g., port 1) and a second port (e.g. port 3) at the input of the coupler. The mixed signals at the three outputs of the coupler are detected with single ended detectors $108_1$, $108_2$, $108_3$. After Alternating Current (AC) coupling by AC couplers $110_1$-$110_3$, the detected signals are digitized by three analog-to-digital converters (ADCs) $112_1$-$112_3$, as opposed to just two ADCs used in state of the art receivers such as reported in S. Savory, Optics Express, Vol. 16, Issue 2, pp. 804-817 (2008).

The electrical currents after the three photo-detectors and AC coupling are:

$$\begin{pmatrix} I_1 \\ I_2 \\ I_3 \end{pmatrix} = \frac{2\sqrt{2}}{5} \begin{pmatrix} \mathrm{Re}(E_{LO}^* E_s) \\ -\mathrm{Re}(E_{LO}^* E_s) - \mathrm{Im}(E_{LO}^* E_s) \\ \mathrm{Im}(E_{LO}^* E_s) \end{pmatrix} + \frac{1}{5} \begin{pmatrix} |E_s|^2 \\ 2|E_s|^2 \\ 2|E_s|^2 \end{pmatrix} \quad \text{(Eq. 1)}$$

where Re indicates a real part of the signal, Im indicates an imaginary part of a signal and $E^*_{LO}$ indicates a complex conjugate of the LO signal. After the ADCs, the three detected signals are added together by adder 114 to obtain the directly detected signal term:

$$(I_1 + I_2 + I_3 = |E_s|^2) \quad \text{(Eq. 2)}$$

With the directly detected signal term known, it may be subtracted by subtractor $116_1$ from in-phase part ($I_1$) and by subtractor $116_2$ from quadrature part ($I_3$) in the digital domain, so that the in-phase and quadrature parts only contain the coherently detected beat term (Eq. 1). Note that scaled versions of the signals may be provided to the first and second subtractors $116_1$, $116_2$. The in-phase and quadrature parts are provided to a digital signal processor 118 for recovery of the received signal $E_S$ 102. Further, note that the scaled versions of the signals provided to the first and second subtractors (e.g., first filtered signal, the directly detected signal term and the third filtered signal) may be tuned based on feedback such as one or more of the first detected signal, the second detected signal, the third detected signal, the in-phase signal, the quadrature signal, and the recovered optical signal. Scaling of the signals prior to the subtractors may also be tuned from time-to-time based on feedback from the digital signal processor or feedback from the analog elements of the receiver.

As the separated directly detected signal term $|E_s|^2$ contains signals from all the channels, it can also be further processed to improve system performance. For example, the directly detected signal term can be used for cross-phase modulation (XPM) compensation. Note that FIG. 1 only shows the detection of one polarization, and the detection of polarization division multiplexed (PDM) signals can be achieved by using two sets of that shown in FIG. 1 together with polarization beam splitters and couplers.

The optical hybrid may also be formed by a N×N coupler, with N an integer greater than 2. The phase of the beating team in each port is shifted by $2\pi/N$ with respect to each other for a N×N coupler with equal power split ratios among different ports. For a N×N coupler with a different power split ratio among all the ports, the relative phase shifts of the beating teams among different ports are different. In all these cases, different scaling of the signals will be performed to account optical losses of the coupler and phase differences among different ports of the coupler and to properly combine the signals to determine the in-phase, quadrature and directed detected signals. In a similar manner, adjustments can be made to the scaling of the signal sets provided for algebraic processing after detection of the N signals in embodiments that utilize a M×N coupler.

Figure 2:
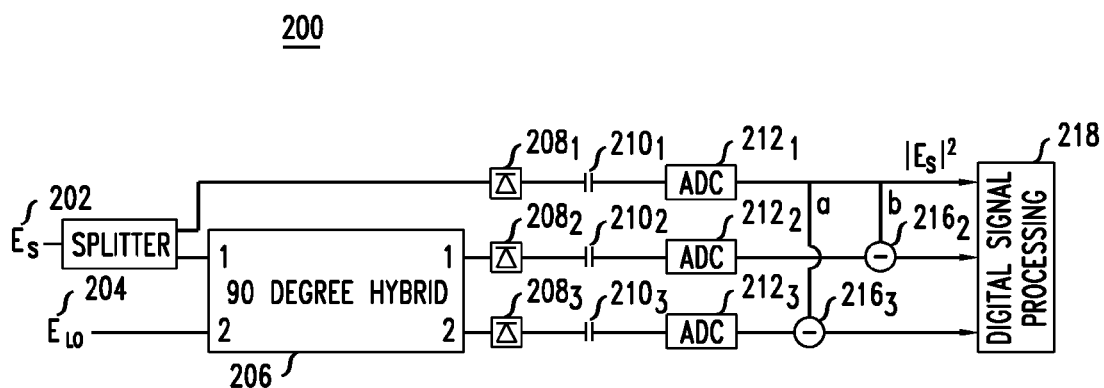
FIG. 2 depicts a high-level block diagram of one embodiment of a coherent optical receiver according to the principles of the invention.

FIG. 2 depicts a high-level block diagram of one embodiment of a coherent optical receiver according to the principles of the invention. In the coherent optical receiver 200 of FIG. 2, a 90-degree hybrid 206 is used (e.g., 2×2 for single-ended detectors, or 2×4 for balanced detectors). Before entering the hybrid, the received signal $E_S$ 202 is divided by a splitter 205, and one part of the signal is directly detected by a photo detector $208_1$ and digitized by a dedicated ADC $212_1$ to represent the directly detected signal term (Eq. 2) in the digital domain. The other part of the receiver signal and LO signal $E_{LO}$ 204 enter into port 1 and port 2 at the input of the 90-degree hybrid 206. The mixed signals at outputs of the hybrid are detected with single ended or balanced detectors $208_2$-$208_3$. After AC coupling by AC couplers $210_2$-$210_3$, the detected signals are digitalized by two ADCs $212_2$-$212_3$, one for the in-phase part and the other for quadrature part.

With the directly detected signal term known, it is subtracted by subtractors $216_2$-$216_3$ from the in-phase part and quadrature part for single ended detectors, or it can be used to eliminate the remaining directly detected signal term from in-phase part and quadrature part for balanced detection, so that the in-phase and quadrature parts only contain the coherently detected term. There may be a respective scaling factor (a, b, c) applied to the one or more of the directly detected signal term, the in-phase part and the quadrature part prior to the subtractors $216_2$-$216_3$ to account for splitting loss of splitter 202 as well as 90-degree 206 optical losses, or different photo-diode $208_1$-$208_3$ responsivities. The in-phase and quadrature parts are provided to a digital signal processor 218 for recovery of the received signal $E_S$ 202.

As the separated directly detected signal term $|E_s|^2$ contains signals from all channels, it may be further processed to improve system performance. For example, it can be used for cross-phase modulation (XPM) compensation. Note that FIG. 2 shows the detection of one polarization, but the detection of polarization division multiplexed (PDM) signals can be achieved by using two sets of that shown in FIG. 2 together with polarization beam splitters and couplers.

Figure 3:
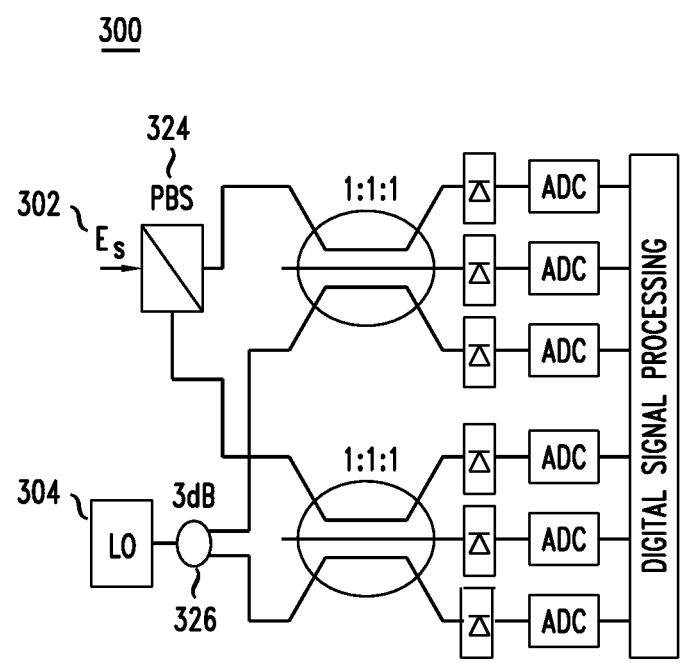
FIG. 3 depicts a high-level block diagram of one embodiment of a coherent optical receiver according to the principles of the invention.

FIG. 3 depicts a high-level block diagram of one embodiment of a coherent optical receiver according to the principles of the invention. In FIG. 3, received signal Es 302 is a PDM signal. Accordingly, the received signal $E_S$ 302 is split by polarization beam splitter 324 so that for each polarization (each of the polarization multiplexes) a coupler may be supplied with a version of the received signal. Also, local oscillator (LO) signal $E_{LO}$ 304 is split by coupler 326 before being provided to sets of the receivers shown and described with respect to FIG. 1, FIG. 2, or FIG. 4.

Figure 4:
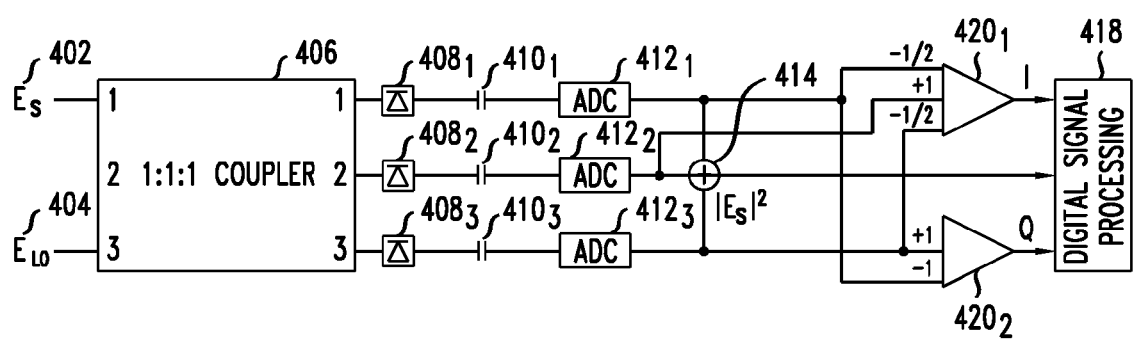
FIG. 4 depicts a high-level block diagram of one embodiment of a coherent optical receiver according to the principles of the invention.

FIG. 4 depicts a high-level block diagram of one embodiment of a coherent optical receiver according to the principles of the invention. In the coherent optical receiver 400 of FIG. 3, a 3×3 coupler 406 with 1:1:1 power split ratio is used as a hybrid. The received signal $E_S$ 402 and LO signal $E_{LO}$ 404 each enter into a port (e.g., port 1 and port 3 respectively) at the input of the coupler. The mixed signals at the three outputs of the coupler are detected with single ended detectors $408_1$, $408_2$, $408_3$. In the receiver of this example, there is a $\frac{2}{3}\pi$ difference between three coherent beating terms:

$$\begin{pmatrix} I_1 \\ I_2 \\ I_3 \end{pmatrix} = \frac{2}{3} |E_L||E_s| \begin{pmatrix} \cos(\varphi + 2\pi/3) \\ \cos(\varphi) \\ \cos(\varphi - 2\pi/3) \end{pmatrix} + \frac{1}{3} \begin{pmatrix} |E_s|^2 + |E_L|^2 \\ |E_s|^2 + |E_L|^2 \\ |E_s|^2 + |E_L|^2 \end{pmatrix}, \quad \text{(Eq. 3)}$$

wherein $\varphi$ represents the phase difference between the LO and the received signal, $|E_L|^2$ is the directly detected LO, including LO relative intensity noise (RIN).

One advantage of this embodiment is that LO RIN can also be eliminated with signal processing. After AC coupling by AC couplers $410_1$-$410_3$, the detected signals that have been filtered are digitized by three analog-to-digital converters (ADCs) $412_1$-$412_3$. The electrical currents after the three photo-detectors and AC coupling are:

$$\begin{pmatrix} I_1 \\ I_2 \\ I_3 \end{pmatrix} = \frac{2}{3}|E_L||E_s| \begin{pmatrix} \cos(\varphi + 2\pi/3) \\ \cos(\varphi) \\ \cos(\varphi - 2\pi/3) \end{pmatrix} + \frac{1}{3}\begin{pmatrix} |E_s|^2 + |\tilde{E}_L|^2 \\ |E_s|^2 + |\tilde{E}_L|^2 \\ |E_s|^2 + |\tilde{E}_L|^2 \end{pmatrix} \quad \text{(Eq. 4)}$$

where $|\tilde{E}_L|^2$ is the residual LO power variation due to RIN. After the ADCs $412_1$-$412_3$, the three detected signals are added together by adder 414 to obtain the directly detected signal term:

$$(I_0 = I_1 + I_2 + I_3 = |E_s|^2 + |\tilde{E}_s|^2) \quad \text{(Eq. 5)}$$

Accordingly, one embodiment according to the principles of the invention enables the use of $I_0$ for DSP purposes such as compensation of nonlinear effects (e.g., XPM).

The in-phase I and quadrature Q signals can be obtained by $$I_I = (I_2 - 0.5 I_3 - 0.5 I_1) = |E_L||E_s|\cos\varphi \quad \text{(Eq. 6)}$$

$$I_Q = \frac{\sqrt{3}}{2}(I_3 - I_1) = |E_L||E_s|\sin\varphi \quad \text{(Eq. 7)}$$

For this purpose, appropriately weighted (i.e., scaled) versions of the three detected signals (i.e., a first signal, a second signal and a third signal) are provided to comparators $420_1$, $420_2$ which output the in-phase part and quadrature part. The in-phase and quadrature parts are provided to a digital signal processor 418 for recovery of the received signal Es 402. The weighting of the versions of the detected signals may also be adjusted through appropriate feedback in order to achieve (e.g., improved, maximum possible) direct-detection beat term suppression. Such feedback may be provided by the DSP or optical components of the receiver (e.g., a receiver element operating on a signal prior to an analog-to-digital conversion such as a hybrid, a detector, a coupler). Examples of appropriate feedback include the first detected signal, the second detected signal, the third detected signal, the first filtered signal, the second filtered signal, the third filtered signal, the in-phase signal, the quadrature signal, and the recovered optical signal.

Note that in the above embodiment, three ADCs are used, and signal processing to get in-phase/quadrature (I/Q) components is performed in the digital domain. If the direct-detection terms are not needed for further signal processing, signal processing to obtain the I/Q components can be performed in the analog domain first and then only two ADCs are utilized to digitize the resulting I/Q components.

According to the principles of the invention, the directly detected signal term is completely separated from the detected signals in a coherent receiver, and therefore the directly detected signal term can be utilized to completely eliminate the interference from other WDM channels in a coherent optical receiver for colorless operation. Apart from the above benefits, embodiments according to the invention can also lower the requirement on LO power. The present inventions may be embodied in other specific apparatus and/or methods.

The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flowcharts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus comprising:
   an M×N coupler for receiving an optical signal into a first of M input ports of the M×N coupler and for receiving a local oscillator signal into a second of the M input ports, where M and N are integers larger than 2;
   N detectors, each detector for detecting a mixed signal from a respective output of the M×N coupler to generate one of N respective detected signals;

N Alternating Current (AC) couplers, each AC coupler for filtering a respective one of the detected signals to correspondingly generate one of N filtered signals;
an adder for adding the N filtered signals to determine a directly detected signal term;
a first subtractor for subtracting the directly detected signal term from a first set of at least one of the N filtered signals to determine an in-phase signal;
a second subtractor for subtracting the directly detected signal term from second set of at least one of the N filtered signals to determine a quadrature signal; and
a digital signal processor for processing the in-phase signal and the quadrature signal in the digital domain to recover the optical signal.

2. The apparatus of claim 1 wherein
the M×N coupler is a 3×3 coupler for receiving an optical signal and a local oscillator signal into a first input port and a third input port respectively of the 3×3 coupler;
the N detectors are three detectors, each detector for detecting a mixed signal from a respective output of the 3×3 coupler to generate one of a first detected signal, a second detected signal and a third detected signal;
the N AC couplers are three AC couplers, each AC coupler for filtering a respective one of the first detected signal, the second detected signal and the third detected signal to correspondingly generate a first filtered signal, a second filtered signal or a third filtered signal;
the adder is configured to add the first filtered signal, the second filtered signal and the third filtered signal to determine a directly detected signal term;
the first subtractor is configured to subtract the directly detected signal term from the first filtered signal to determine an in-phase signal; and
the second subtractor is configured to subtract the directly detected signal term from the third filtered signal to determine a quadrature signal.

3. The apparatus of claim 2 further comprising:
three analog-to-digital converters (ADCs), each ADC for converting one of the first filtered signal, the second filtered signal and the third filtered signal into digital form.

4. The apparatus of claim 2 further comprising:
three analog-to-digital converters (ADCs), a first ADC for converting the in-phase signal into digital form, a second ADC for converting the directly detected signal term into digital form, and a third ADC for converting the quadrature signal into digital form.

5. The apparatus of claim 2 wherein the digital signal processor is configured to compensate the optical signal based on the directly detected signal term.

6. The apparatus of claim 2 wherein the 3×3 coupler has a 1:2:2 power split ratio.

7. The apparatus of claim 2 wherein the 3×3 coupler has a 1:1:1 power split ratio.

8. The apparatus of claim 2 further comprising a multipler for scaling one or more of the first filtered signal, second filtered signal, and the third filtered signal prior to at least one of the adder, the first subtractor and the second subtractor.

9. The apparatus of claim 2 wherein the multiplier is configured to apply scaling based on feedback from at least one of the digital signal processor, the 3×3 coupler, one or more of the detectors, one or more of the AC couplers, the adder, the first subtractor and the second subtractor.

10. A method comprising:
receiving at a receiver an optical signal into a first input port of M input ports of a M×N coupler and local oscillator signal into a third input port of the M input ports of the M×N coupler and forming N output mixed signals, wherein M and N are integers larger than 2;
detecting the N output mixed signals to generate a corresponding N detected signals;
filtering the N detected signals to generate a corresponding N filtered signals;
adding the N filtered signals to determine a directly detected signal term;
subtracting from a first set of at least one of the N filtered signals the directly detected signal term to determine an in-phase signal;
subtracting from a second set of at least one of the N filtered signals the directly detected signal term to determine a quadrature signal; and
processing the in-phase signal and the quadrature signal in the digital domain to recover the optical signal.

11. A method of claim 10 wherein:
the receiving comprises receiving the optical signal and the local oscillator signal into the first input port and the third input port respectively of a 3×3 coupler for forming output mixed signals, wherein N is an integer larger than 2;
the detecting comprises detecting the output mixed signals to correspondingly generate a first detected signal, a second detected signal and a third detected signal;
the filtering comprises filtering the first detected signal, the second detected signal and the third detected signal respectively to generate corresponding first filtered signal, second filtered signal and third filtered signal;
the adding comprises adding the first filtered signal, the second filtered signal and the third filtered signal to determine the directly detected signal term;
the subtracting to determine the in-phase signal comprises subtracting from the first filtered signal the directly detected signal term to determine the in-phase signal; and
the subtracting to determine the quadrature signal comprises subtracting from the third filtered signal the directly detected signal term to determine the quadrature signal.

12. The method of claim 11 further comprising:
converting the in-phase signal and the quadrature signal from the analog domain to the digital domain.

13. The method of claim 11 further comprising:
converting the first filtered signal, the second filtered signal and the third filtered signal from the analog domain to the digital domain.

14. The method of claim 11 wherein the adding, the subtracting to determine the in-phase signal and the subtracting to determine the quadrature signal occur in the digital domain or the analog domain.

15. The method of claim 11 further comprising scaling at least one of the first filtered signal, second filtered signal, and the third filtered signal prior to at least one of the adding, the subtracting to determine the in-phase signal and the subtracting determine the in-phase signal.

16. An apparatus comprising:
an M×N coupler for receiving an optical signal and a local oscillator signal into a first input port and a third input port respectively of the M×N coupler, wherein M and N are integers larger than 2;
N detectors, each detector for detecting a mixed signal from a respective output of the N ×N coupler to generate one of N detected signals;
N Alternating Current (AC) couplers, each AC coupler for filtering a respective one of the N detected signals to correspondingly generate one of N filtered signals;

a first combiner for combining a first set of scaled versions of the N filtered signals to determine an in-phase signal;
a second combiner for combining a second set of scaled versions of the N filtered signals to determine a quadrature signal; and
a digital signal processor for processing the in-phase signal and the quadrature signal in the digital domain to recover the optical signal.

17. The apparatus of claim 16 wherein the M×N coupler is a 3×3 coupler for receiving an optical signal and a local oscillator signal into a first input port and a third input port respectively of the 3×3 coupler;
the N detectors are three detectors, each detector for detecting a mixed signal from a respective output of the 3×3 coupler to generate one of a first detected signal, a second detected signal and a third detected signal;
the N AC couplers are three AC couplers, each AC coupler for filtering a respective one of the first detected signal, the second detected signal and the third detected signal to correspondingly generate a first filtered signal, a second filtered signal or a third filtered signal;
the first combiner is configured to combine first scaled versions of the first filtered signal, the second filtered signal and the third filtered signal to determine the in-phase signal; and
the second combiner is configured to combine second scaled versions of the first signal term, the second filtered signal and the third filtered signal to determine the quadrature signal.

18. The apparatus of claim 17 further comprising:
three analog-to-digital converters (ADCs), each ADC for converting one of the first filtered signal, the second filtered signal and the third filtered signal into digital form.

19. The apparatus of claim 17 further comprising:
a first ADC for converting the in-phase signal into digital form; and
a second ADC for converting the quadrature signal into digital form.

20. The apparatus of claim 17 further comprising:
an adder for adding the first filtered signal, the second filtered signal and the third filtered signal to determine a directly detected signal term, the directly detected signal term for delivery to the digital signal processor for compensation of the optical signal.

21. The apparatus of claim 17 wherein the 3×3 coupler has a 1:2:2 power split ratio.

22. The apparatus of claim 17 wherein the 3×3 coupler has a 1:1:1 power split ratio.

23. A method comprising:
receiving at a receiver an optical signal and local oscillator signal into a first input port and a third input port respectively of a 3×3 coupler for forming output mixed signals;
detecting the output mixed signals to correspondingly generate a first detected signal, a second detected signal and a third detected signal;
filtering the first detected signal, the second detected signal and the third detected signalrespectively to generate a first filtered signal, a second filtered signal and a third filtered signal;
combining a first set of scaled versions of the first filtered signal, the second filtered signal and the third filtered signal to determine an in-phase signal;
combining a second set of scaled versions of the first signal term, the second filtered signal and the third filtered signal to determine a quadrature signal; and
processing the in-phase signal and the quadrature signal in the digital domain to recover the optical signal.

24. An apparatus comprising:
a 90-degree hybrid for receiving an optical signal and a local oscillator signal into a first input port and a second input port respectively of the 90-degree hybrid;
three detectors, a first detector for detecting the optical signal to generate a first detected signal, a second detector and third detector for detecting a mixed signal from a respective output of the 90-degree hybrid to correspondingly generate a second detected signal and a third detected signal;
three Alternating Current (AC) couplers, each AC coupler for filtering a respective one of the first detected signal, the second detected signal and the third detected signal to correspondingly generate a first filtered signal, a second filtered signal or a third filtered signal;
a first subtractor for subtracting the first filtered signal from the third filtered signal to determine an quadrature signal;
a second subtractor for subtracting the first filtered from the second filtered signal to determine an in-phase signal; and
a digital signal processor for processing the in-phase signal and the quadrature signal in the digital domain to recover the optical signal.

25. The apparatus of claim 24 wherein the digital signal processor is configured to compensate the optical signal based on the first filtered signal.

* * * * *